(12) United States Patent
Saavedra

(10) Patent No.: US 8,049,357 B2
(45) Date of Patent: Nov. 1, 2011

(54) APPARATUS AND METHOD FOR ELECTRICAL POWER GENERATION FROM LOW-HEAD LOW-FLOW WATER SOURCES

(76) Inventor: John A. Saavedra, Irmo, SC (US)

( * ) Notice: Subject to any disclaimer, the term of this patent is extended or adjusted under 35 U.S.C. 154(b) by 0 days.

(21) Appl. No.: 13/034,132

(22) Filed: Feb. 24, 2011

(65) Prior Publication Data

US 2011/0140436 A1 Jun. 16, 2011

(51) Int. Cl.
*F03B 13/00* (2006.01)
*H02P 9/04* (2006.01)
*F03B 13/10* (2006.01)
*F03B 13/12* (2006.01)

(52) U.S. Cl. .............. 290/54; 290/42; 290/53; 416/83; 475/11

(58) Field of Classification Search .............. 290/42, 290/53, 54; 416/83; 475/11
See application file for complete search history.

(56) References Cited

U.S. PATENT DOCUMENTS

| | | | |
|---|---|---|---|
| 523,963 A | 7/1894 | Gerlach | 416/6 |
| 692,396 A | 2/1902 | Wilcox | 417/330 |
| 802,228 A | 10/1905 | Morton | 416/83 |
| 827,889 A | 8/1906 | Smith | 416/80 |
| 905,320 A | 12/1908 | Isham | 416/83 |
| 908,316 A | 12/1908 | Nutt | 416/6 |
| 956,796 A | 5/1910 | Butler | 417/330 |
| 970,048 A | 9/1910 | Harmon | 60/413 |
| 1,097,073 A | 5/1914 | Bemis | 417/330 |
| 1,263,865 A | 4/1918 | Dale | 415/60 |
| 1,604,632 A | 10/1926 | Carter | 417/330 |
| 1,624,349 A | 4/1927 | Mann et al. | 416/6 |
| 1,688,032 A | 10/1928 | Blair | 60/500 |
| 2,161,215 A | 6/1939 | Wise | 415/5 |
| 2,848,189 A * | 8/1958 | Caloia | 60/505 |
| 3,532,067 A * | 10/1970 | Baker et al. | 114/279 |
| 3,894,241 A * | 7/1975 | Kaplan | 290/42 |
| 3,918,261 A * | 11/1975 | Bailey | 60/506 |
| 4,002,416 A * | 1/1977 | Axford | 417/330 |
| 4,053,253 A | 10/1977 | Coffer | 415/5 |
| 4,228,360 A * | 10/1980 | Navarro | 290/43 |
| 4,268,757 A * | 5/1981 | Rogers | 290/53 |
| 4,400,940 A * | 8/1983 | Watabe et al. | 60/502 |
| 4,441,675 A * | 4/1984 | Boehringer et al. | 244/213 |
| 4,470,770 A * | 9/1984 | Grose | 417/334 |
| 4,480,966 A * | 11/1984 | Smith | 417/332 |
| 4,490,621 A * | 12/1984 | Watabe et al. | 290/42 |
| 4,514,644 A * | 4/1985 | Westling | 290/53 |
| 4,525,122 A * | 6/1985 | Krnac | 416/80 |
| 4,541,242 A * | 9/1985 | Thompson, Jr. | 60/506 |
| 4,580,400 A * | 4/1986 | Watabe et al. | 60/398 |
| 4,589,344 A | 5/1986 | Davison | 104/24 |

(Continued)

*Primary Examiner* — Pedro J Cuevas
(74) *Attorney, Agent, or Firm* — Dority & Manning, P.A.

(57) ABSTRACT

Apparatus and method for generating electrical energy from a body of water flowing in a downstream direction are disclosed. A lever arm including a flap member is coupled to a rotatable shaft. The lever arm is movable from a first vertical position where the flap member is located in the body of water and a second vertical position where the flap member is in located above the body of water. When the lever arm is lowered into the first vertical position, the body of water engaging the flap member pushes the lever arm from an upstream position to a downstream position. The rotation of the lever arm from the upstream position to the downstream position actuates the rotatable shaft, which can be coupled to a power generation device configured to generate electrical energy from motion of the rotatable shaft.

17 Claims, 9 Drawing Sheets

U.S. PATENT DOCUMENTS

| | | | | |
|---|---|---|---|---|
| 4,595,336 A * | 6/1986 | Grose | | 416/82 |
| 4,610,140 A * | 9/1986 | Thompson, Jr. | | 60/506 |
| 4,612,768 A * | 9/1986 | Thompson, Jr. | | 60/506 |
| 4,636,141 A * | 1/1987 | Sedlacek | | 416/86 |
| 4,781,023 A * | 11/1988 | Gordon | | 60/506 |
| 4,872,805 A * | 10/1989 | Horiuchi et al. | | 415/7 |
| 4,931,662 A * | 6/1990 | Burton | | 290/42 |
| 5,009,571 A * | 4/1991 | Smith | | 416/79 |
| 5,084,630 A * | 1/1992 | Azimi | | 290/53 |
| 5,094,595 A * | 3/1992 | Labrador | | 417/332 |
| 5,324,169 A * | 6/1994 | Brown et al. | | 416/83 |
| 5,708,305 A * | 1/1998 | Wolfe | | 290/53 |
| 5,834,853 A * | 11/1998 | Ruiz et al. | | 290/54 |
| 5,899,664 A * | 5/1999 | Lawrence | | 416/83 |
| 6,217,284 B1 * | 4/2001 | Lawrence | | 416/83 |
| 6,726,440 B2 * | 4/2004 | Pollard | | 415/4.1 |
| 6,825,574 B1 * | 11/2004 | Mooring | | 290/1 R |
| 7,105,939 B2 * | 9/2006 | Bednyak | | 290/42 |
| 7,157,805 B2 * | 1/2007 | Mooring | | 290/55 |
| 7,411,311 B2 * | 8/2008 | Tal-or | | 290/53 |
| 7,626,281 B2 * | 12/2009 | Kawai | | 290/54 |
| 7,632,069 B2 * | 12/2009 | Kelley | | 416/80 |
| 7,687,931 B2 * | 3/2010 | Gasendo | | 290/54 |
| 7,785,065 B2 | 8/2010 | Clemens | | 415/5 |
| 7,791,213 B2 * | 9/2010 | Patterson | | 290/53 |
| 7,834,474 B2 * | 11/2010 | Whittaker et al. | | 290/53 |
| 7,839,009 B2 | 11/2010 | Rink | | 290/54 |
| 7,905,705 B2 * | 3/2011 | Kelley | | 416/80 |
| 7,989,973 B2 * | 8/2011 | Birkestrand | | 290/44 |
| 2003/0123983 A1 * | 7/2003 | Bolduc | | 416/6 |
| 2009/0224549 A1 * | 9/2009 | Williams | | 290/55 |
| 2009/0224551 A1 * | 9/2009 | Williams | | 290/55 |
| 2010/0327597 A1 * | 12/2010 | Patel | | 290/54 |

* cited by examiner

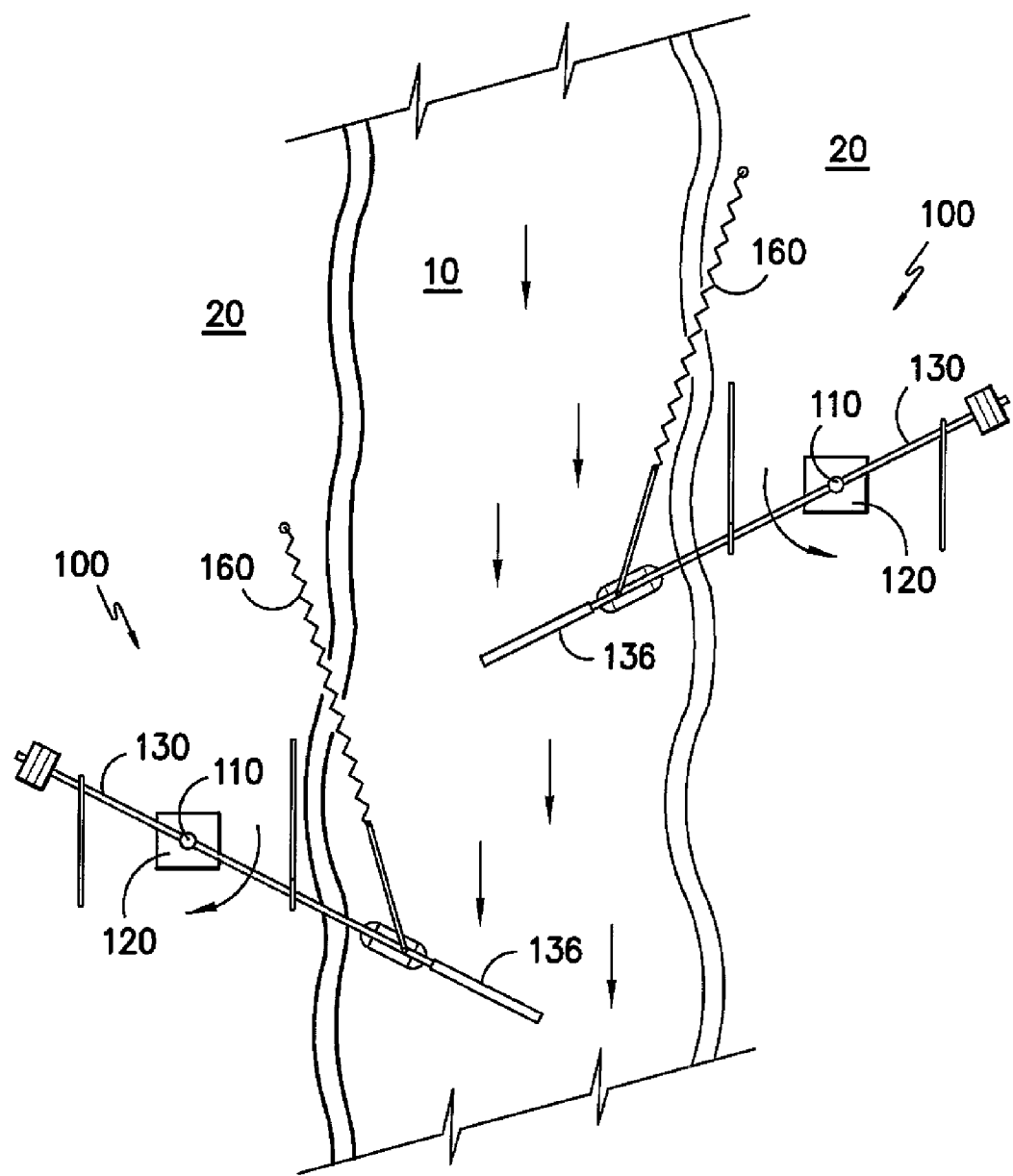
FIG. -1-

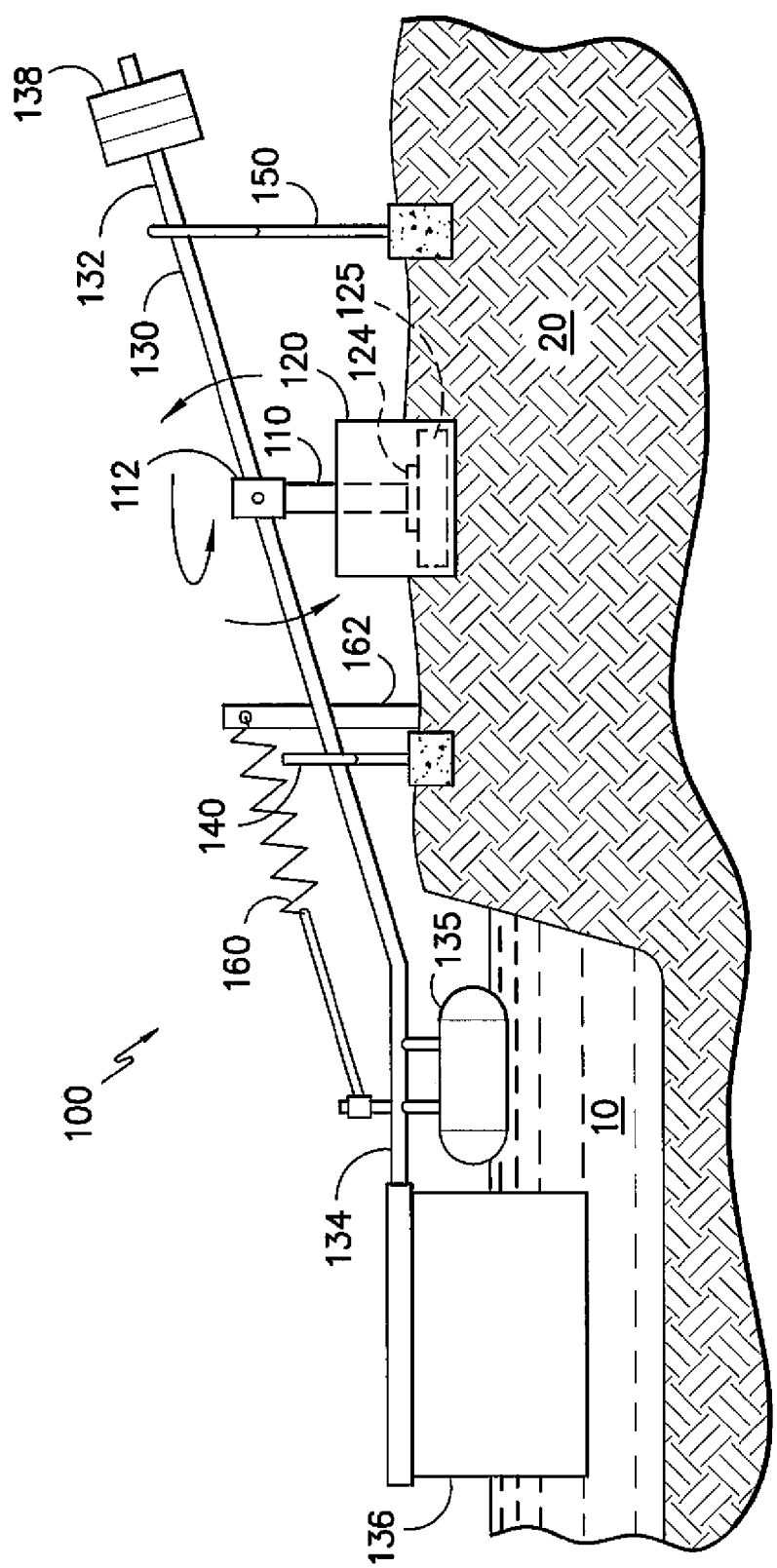
FIG. -2-

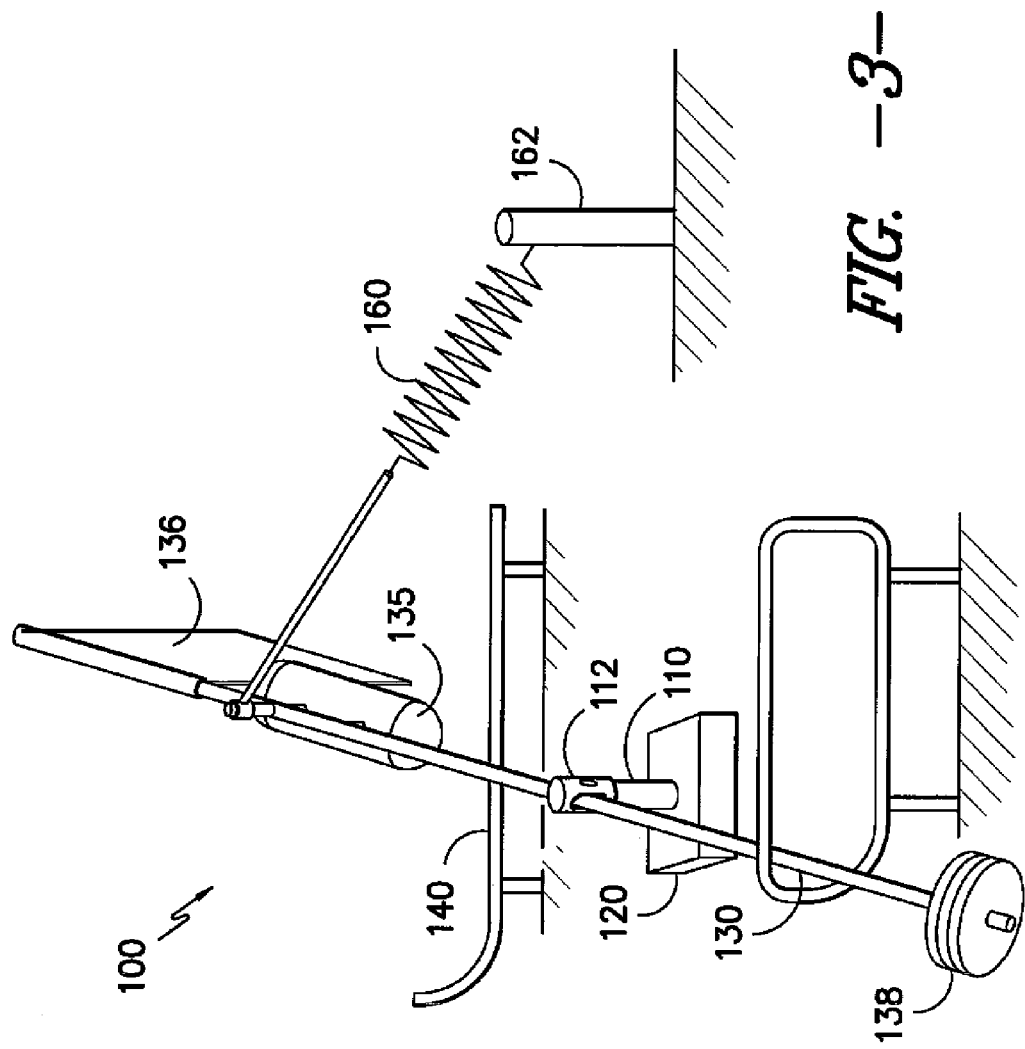
FIG. -3-

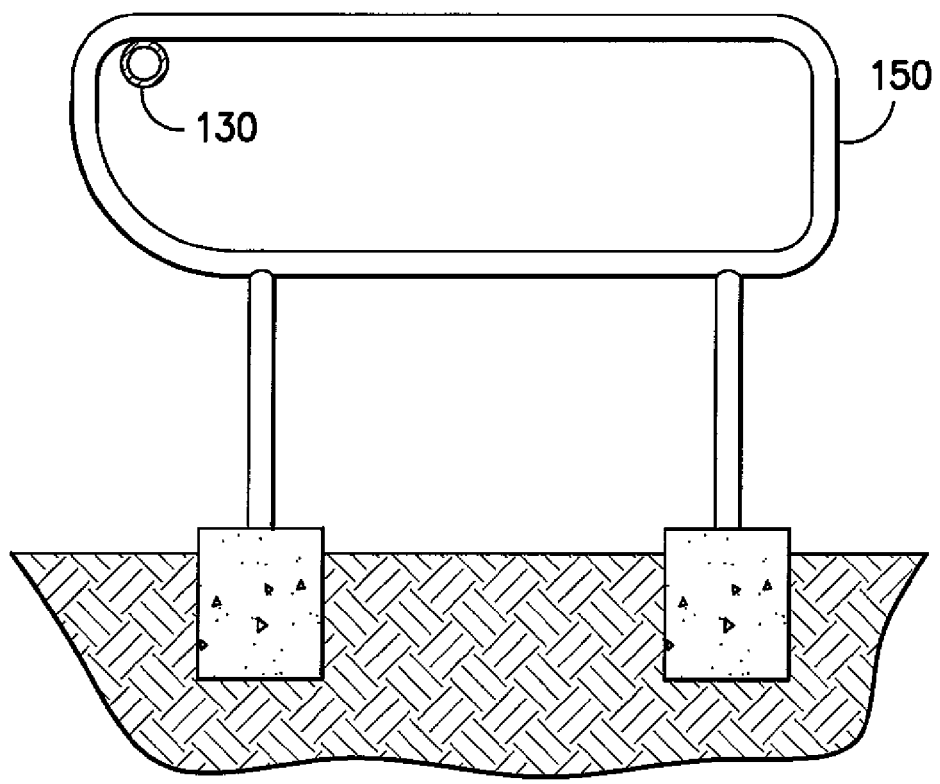
FIG. -4-

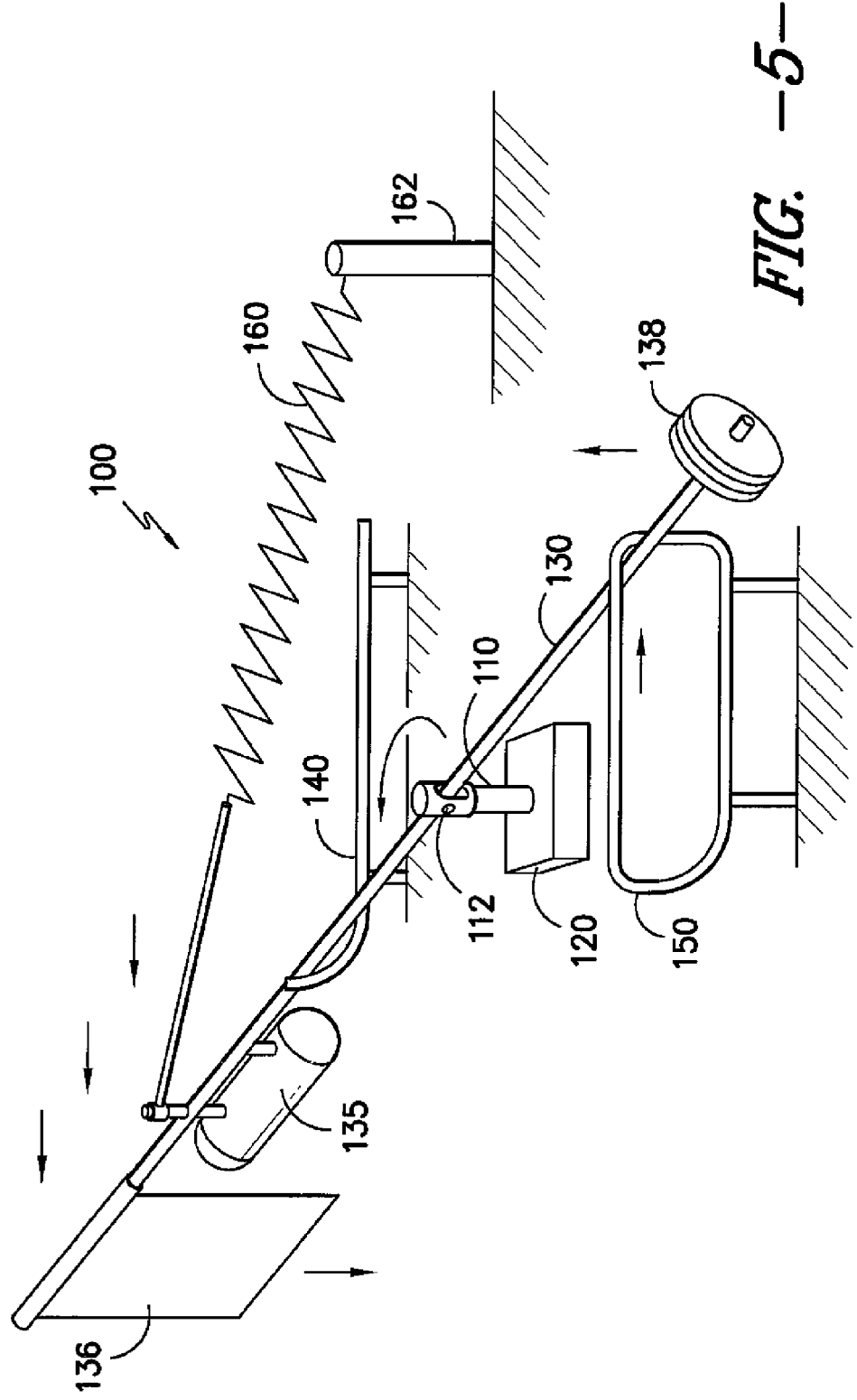
FIG. -5-

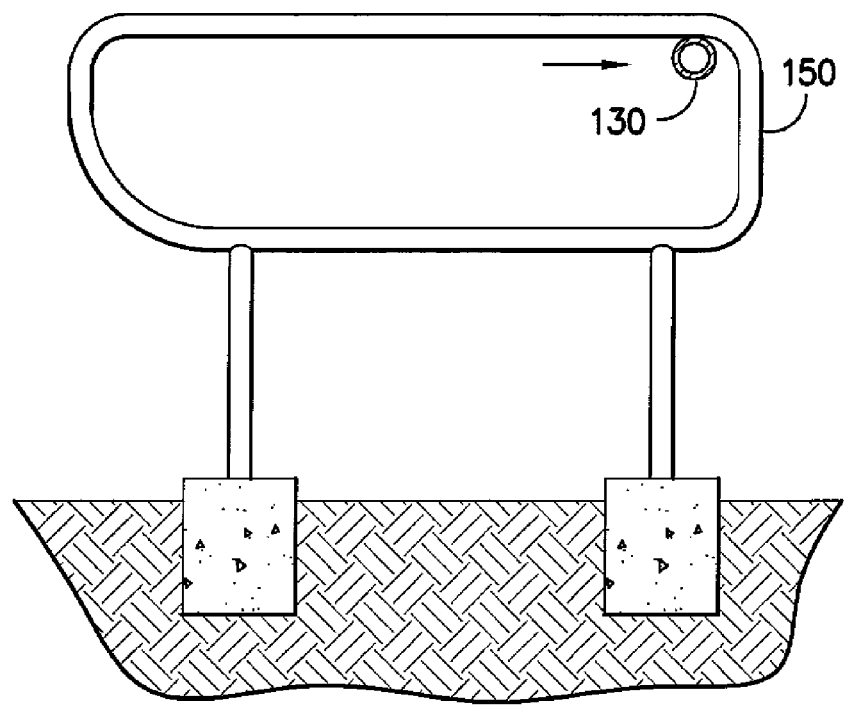
FIG. -6-
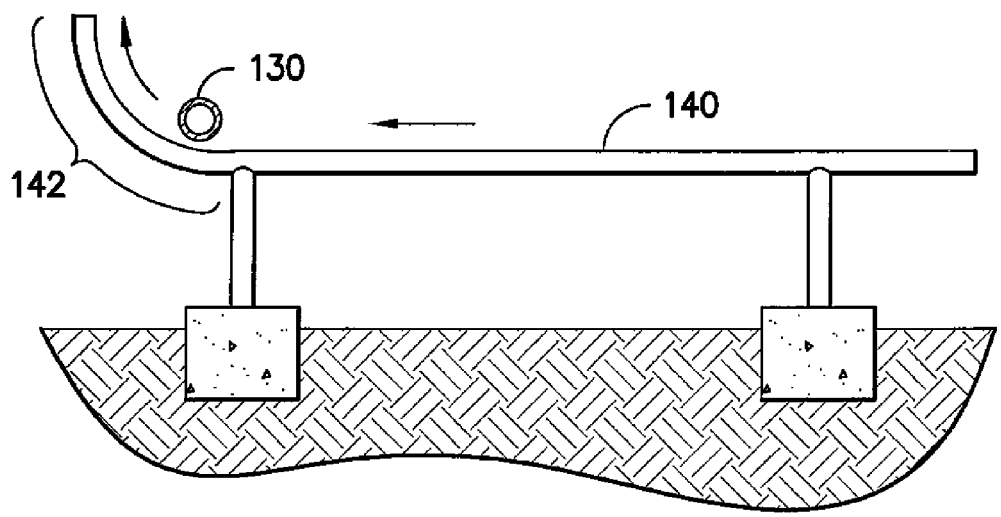
FIG. -7-

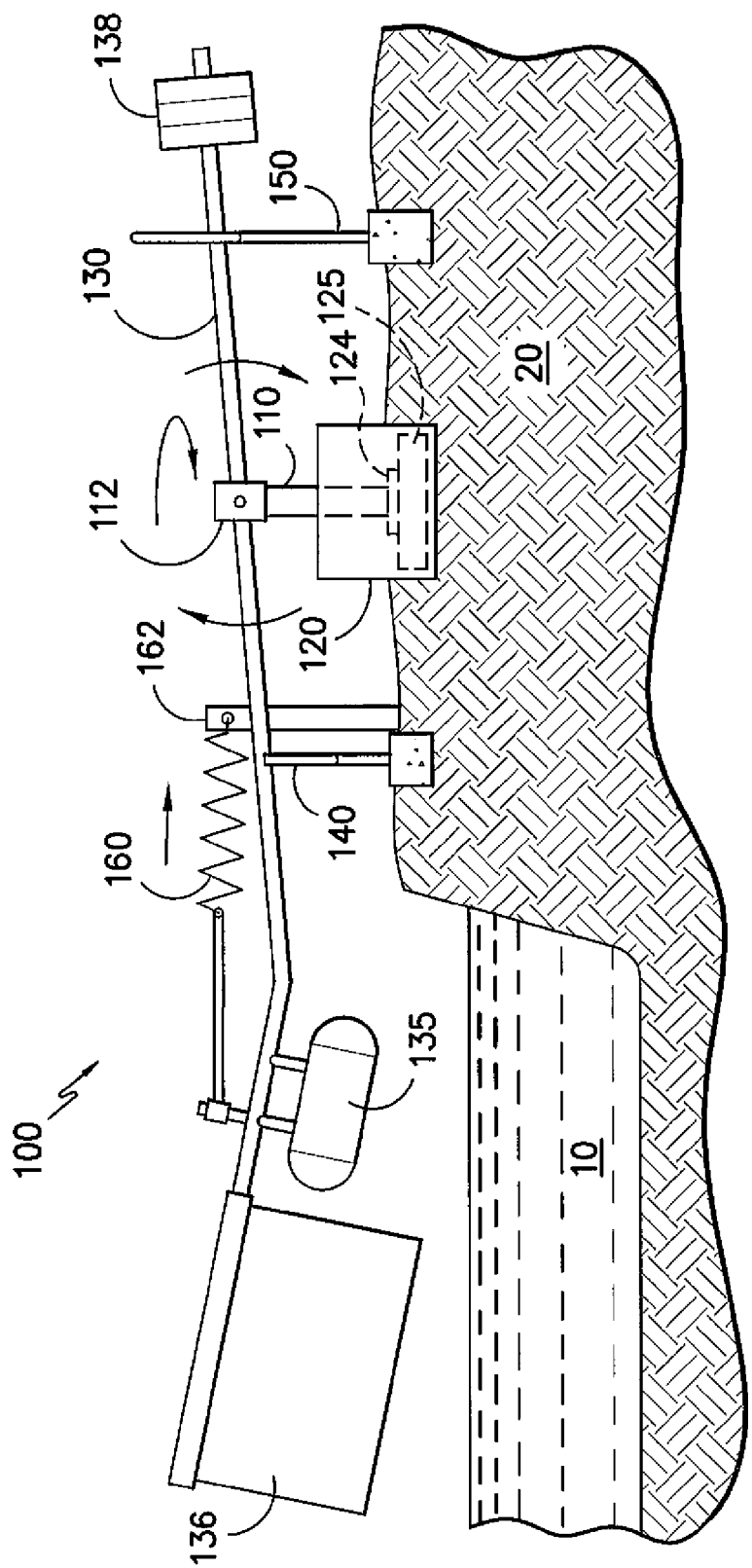
FIG. -8-

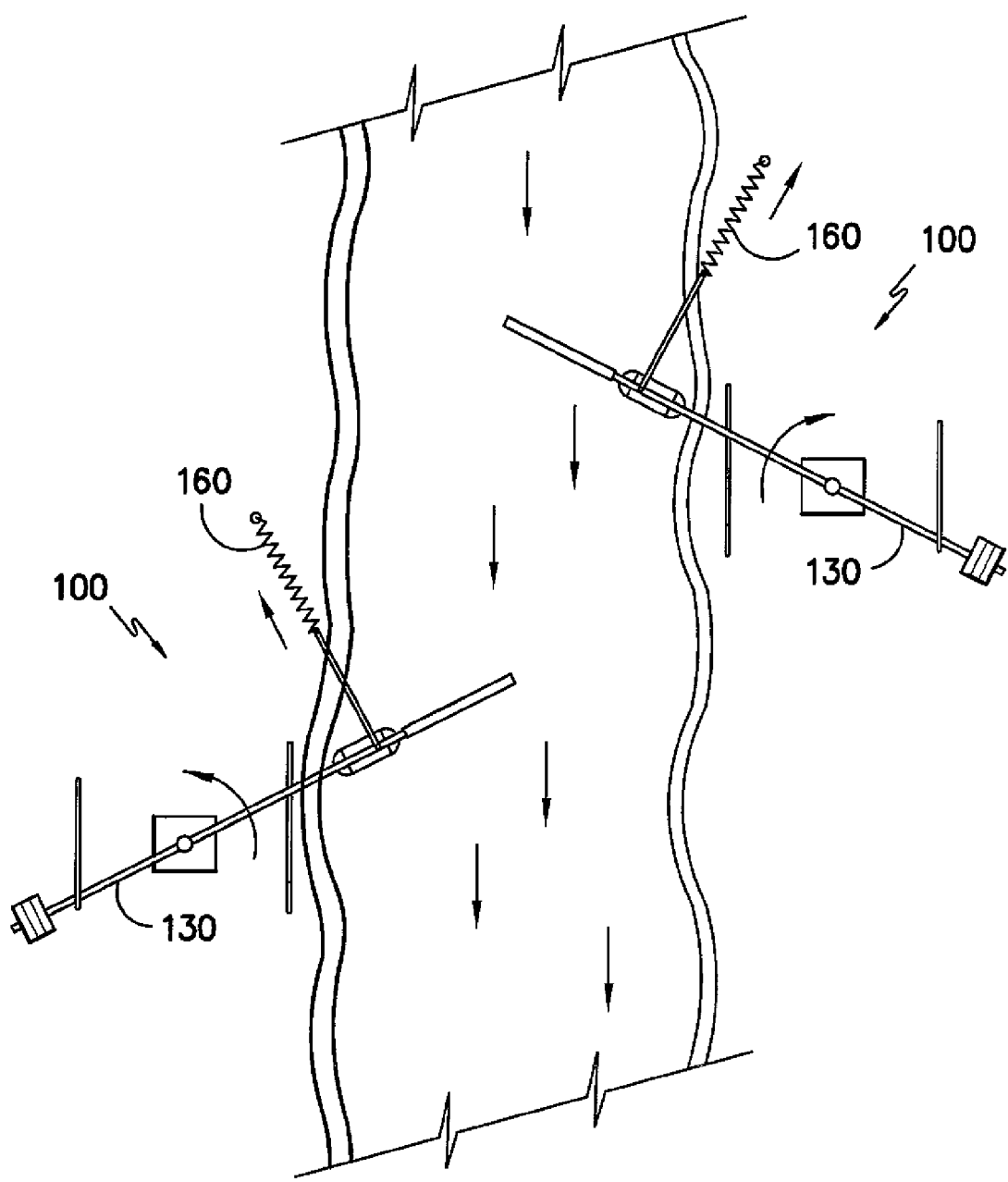
FIG. -9-

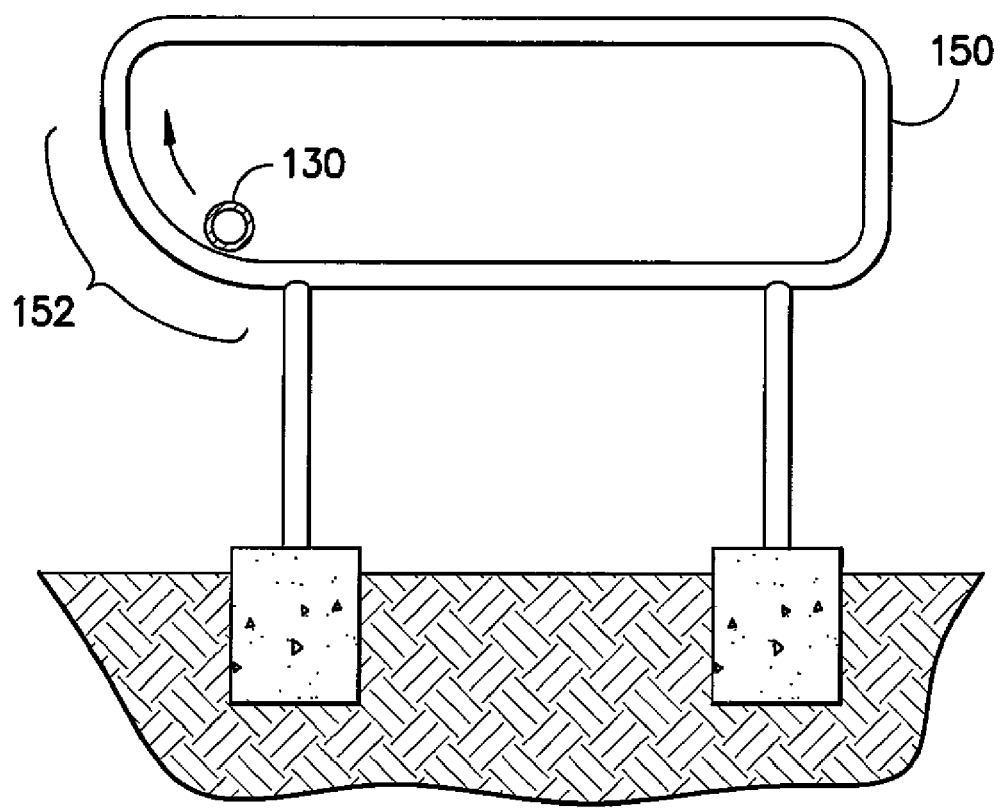
FIG. -10-

APPARATUS AND METHOD FOR ELECTRICAL POWER GENERATION FROM LOW-HEAD LOW-FLOW WATER SOURCES

FIELD OF THE INVENTION

The present disclosure relates generally to hydro power generation and more particularly, to an apparatus and method for low-head, low-flow water power generation.

BACKGROUND OF THE INVENTION

A global need currently exists for additional sources of clean, renewable and affordable energy. Lack of such energy is in part responsible for global hunger and unsafe drinking water, because in many places there are adequate clean, underground water supplies, but no power for pumping the water to the surface. The lack of safe drinking water often results in polluted surface water, water-borne illnesses such as cholera and dysentery, and crop failure due to drought.

In developing countries, typical solutions to bring electricity to rural areas can include either extending the existing power grid or installing diesel generators. Both of these solutions involve high startup costs, capital outlay, and ongoing operational and maintenance expenses. For instance, extending the grid may be prohibitively expensive. Diesel generators have high startup costs and bring increased usage and transportation of fossil fuels, creating pollution as an unintended byproduct. In addition, the proper maintenance and repair of diesel generators may be beyond the abilities of the local population, leading to a dependency on the people or organization that supplied the generator.

Water power generation can be a viable alternative to extending the grid or providing diesel generators in geographic areas located adjacent a body of moving water, such as a creek, stream, or river. Water turbines can be used to harness the power of water flow to generate electricity. Deployment of water turbines, however, is typically limited to high-head, high-flow water sites, limiting the suitability of water turbines in many areas.

While high-head, high-flow water sites are relatively scarce, there are many bodies of water throughout the world that can be characterized as providing a low-head, low-flow environment. Low-head, low flow water sources are relatively abundant and can be a good source for providing power in undeveloped areas located off the grid.

For centuries, water wheels and stream wheels have been used to harness energy in low-head, low-flow environments. Improvements and developments in water wheel and stream wheel technology have been significantly reduced with the development of the water turbine. However, there is currently a renewed interest in development of water wheels and stream wheels in response to the worldwide demand for energy, especially in developing countries having areas located off the grid. There is also an interest in development of micro-hydro and pico-hydro power sources, such as less than 5 kW, for home or community use.

Thus, a need exists for an improved apparatus and method for generating electrical power from low-head, low flow water sources. An apparatus and method that uses simple technology and requires reduced training and maintenance would be particularly useful.

SUMMARY OF THE INVENTION

Aspects and advantages of the invention will be set forth in part in the following description, or may be obvious from the description, or may be learned through practice of the invention.

One exemplary embodiment of the present disclosure is directed to an apparatus for generating electrical energy from a body of water flowing in a downstream direction. The apparatus includes a rotatable shaft couplable to a power generation device configured to generate electrical energy from motion of the rotatable shaft. The apparatus further includes a lever arm coupled to the rotatable shaft. The lever arm has a first end and a second end and includes a flap member coupled to the first end of the lever arm. The lever arm is movable between a first vertical position when the flap member is located in the body of water and a second vertical position when the flap member is located above the body of water. The lever arm is further movable from an upstream position to a downstream position upon the body of water engaging the flap member when the lever aim is in the first vertical position.

Another exemplary embodiment of the present disclosure is directed to a method of generating electrical energy from a body of water flowing in a downstream direction using a lever arm having a first end and a second end and a flap member coupled to the first end of the lever arm. The method includes pivoting the lever arm from a second vertical position wherein the flap member is located above the body of water to a first vertical position wherein the flap member is located in the body of water; rotating the lever arm from an upstream position to a downstream position upon the body of water engaging the flap member when the flap member is located in the first vertical position; actuating a rotatable shaft with the lever arm when the lever arm rotates from the upstream position to the downstream position; and generating electrical energy from motion of the rotatable shaft as the lever arm actuates the rotatable shaft.

A further exemplary embodiment of the present disclosure is directed to an apparatus for generating electrical energy from a body of water flowing in a downstream direction. The apparatus includes a rotatable shaft couplable to a power generation device configured to generate electricity from motion of the rotatable shaft. The apparatus further includes a lever arm having a first end and a second end. The lever arm is coupled to the rotatable shaft such that the rotatable shaft is located between the first end and the second end of the lever arm. The lever arm includes a flap member coupled to the first end of the lever arm and a counterweight coupled to the second end of the lever arm. The lever arm is movable between a first vertical position wherein the flap member is located in the body of water and a second vertical position wherein the flap member is located above the body of water. The lever arm is further movable from an upstream position to a downstream position upon the body of water engaging the flap member when the lever arm is in the first vertical position. The apparatus further includes a tensioning member configured to retract the lever arm from the downstream position to the upstream position when the lever arm is in the second vertical position. The apparatus further includes a first guide member located between the rotatable shaft and the first end of the lever arm. The first guide member includes an upward extending protrusion configured to guide the lever arm from the first vertical position to the second vertical position. The apparatus further includes a second guide member located between the rotatable shaft and the second end of the lever arm. The second guide member includes an annular track configured to limit horizontal and vertical movement of the lever arm. The annular track includes an upward sloped portion configured to guide the lever arm from the second vertical position to the first vertical position. The lever arm is configured to actuate the rotatable shaft when the lever arm moves from the upstream position to the downstream position.

Variations and modifications can be made to these exemplary embodiments of the present disclosure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a plan view of a plurality of apparatus for generating electrical energy from a body of water flowing in a downstream direction having lever arms rotated in a downstream position according to an exemplary embodiment of the present disclosure;

FIG. 2 provides a side view of an apparatus for generating electrical energy from a body of water flowing in a downstream direction having a lever arm pivoted to a first vertical position according to an exemplary embodiment of the present disclosure;

FIG. 3 provides a perspective view of an apparatus for generating electrical energy from a body of water flowing in a downstream direction having a lever arm rotated to an upstream position and pivoted to a first vertical position according to an exemplary embodiment of the present disclosure;

FIG. 4 provides a cross-sectional view of a lever arm positioned in a second guide member as the lever arm is rotated to the upstream position and pivoted to a first vertical position;

FIG. 5 provides a perspective view of an apparatus for generating electrical energy from a body of water flowing in a downstream direction having a lever arm rotated to a downstream position and pivoted to a first vertical position according to an exemplary embodiment of the present disclosure;

FIG. 6 provides a cross-sectional view of a lever arm positioned in a second guide member as the lever arm is rotated to a downstream position and pivoted to a first vertical position;

FIG. 7 provides a cross-sectional view of a lever arm position in a first guide member as the lever arm is pivoted from a first vertical position to a second vertical position;

FIG. 8 provides a side view of an apparatus for generating electrical energy from a body of water flowing in a downstream direction having a lever arm pivoted to a second vertical position;

FIG. 9 provides a plan view of a plurality of apparatus for generating electrical energy from a body of water flowing in a downstream direction having lever arms rotated to an upstream position; and FIG. 10 provides a cross-sectional view of a lever arm positioned in a second guide member as the lever arm is pivoted from a second vertical position to a first vertical position.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to an apparatus and method for generating electrical energy from a body of water flowing in a downstream direction. A lever arm having a first end and a second end is coupled to a rotatable shaft. The lever arm includes a flap member attached to the first end. The lever arm is movable from a first vertical position where the flap member is located in the body of water and a second vertical position where the flap member is located above the body of water. When the lever arm is lowered into the first vertical position, the body of water engaging the flap member pushes the lever arm from an upstream position to a downstream position. The rotation of the lever arm from the upstream position to the downstream position actuates the rotatable shaft, which can be coupled to a power generation device configured to generate electrical energy from motion of the rotatable shaft.

After the lever arm has reached a downstream position, the flap member is lifted out of the body water as the lever arm pivots to a second vertical position. A tensioning member retracts the lever arm from the downstream position to an upstream position. Once the lever arm is returned to the upstream position, the lever arm is again lowered to a first vertical position where the force of water engaging upon the flap member pushes the lever aim to the downstream position. The process then repeats itself, providing for a continuous cycle for generation of electrical energy.

The apparatus and method of the present disclosure can be constructed and performed using simple technology that requires low maintenance and repair. Moreover, the apparatus and method of the present disclosure is suitable for use in low-head, low-flow environments. In this manner, the present subject matter can provide a viable solution to address energy demands throughout the world, including undeveloped areas that are not currently connected to the electrical grid.

FIG. 1 illustrates a plurality of exemplary apparatus 100 for generating electrical energy from a body of water 10 having water flowing in a downstream direction. The apparatus 100 are located on opposing banks 20 adjacent body of water 10. As illustrated in FIG. 1, apparatus 100 include a rotatable shaft 110 located on bank 20, a base 120 that can house or include a power generation device, and a lever arm 130. The lever arm 130 includes a flap member 136 that can be placed into operative engagement with the body of water 10. The rotatable shaft 110, base 120, and lever arm 130 can be permanently installed on bank 20 or disposed on a mobile device, such as a vehicle or trailer. If disposed on a mobile device, the apparatus 100 can be selectively placed adjacent to different bodies of water as desired.

As illustrated in FIG. 1, the force applied against flap member 136 by the body of water 10 causes the lever arm 130 to rotate from an upstream position (illustrated in FIG. 9) to a downstream position (illustrated in FIG. 1). The rotation of the lever arm 130 actuates rotatable shaft 110. The power generation device located or housed in base 120 can be configured to generate electrical energy from motion of the rotatable shaft 110 as the lever arm 130 actuates the rotatable shaft 110. The electrical energy can be used for any purpose, including powering equipment, providing power to an electrical grid, or for storage in a power storage device, such as a battery or capacitor bank.

As further illustrated in FIG. 1, each apparatus 100 further includes a tensioning member 160. As discussed in more detail below, tensioning member 160 is configured to retract lever arm 130 from the downstream position (illustrated in FIG. 1) to an upstream position (illustrated in FIG. 9) after the flap member 136 has been lifted out of the body of water 10. Tensioning member 160 can be a spring, elastic member, pneumatic or hydraulic cylinder, electrically actuated arm, or other suitable tensioning member. Those of ordinary skill in the art, using the disclosures provided herein, should understand that any number of mechanical or electro-mechanical devices can be used to retract lever arm 130 from a downstream position to an upstream position without deviating from the scope of the present disclosure.

When the lever arm 130 has reached an upstream position, the lever arm 130 can be lowered such that flap member 136 is again placed in operative engagement with body of water 10. This causes the lever arm 130 to rotate from the upstream position to a downstream position, again generating electrical energy from actuation of rotatable shaft 110.

With reference to FIG. 2, an exemplary apparatus 100 will be discussed in detail. FIG. 2 provides a side view of apparatus 100 that includes a rotatable shaft 110 supported in a base 120. Base 120 can include or house a power generation device 125 configured to generate electrical energy from rotation of rotatable shaft 110. For instance, in a particular embodiment, power generation device 125 can include a permanent magnet alternator or generator. Rotatable shaft 110 can be coupled to power generation device 125 through any suitable mechanical arrangement 124, such as a clutch, belt, and/or pulley arrangement.

A lever arm 130 is coupled to rotatable shaft 110 by bidirectional coupling 112. Bidirectional coupling 112 can be any coupling, such as a universal joint, that allows lever arm 130 to pivot about the rotatable shaft 110 between a first vertical position as illustrated in FIG. 2 and a second vertical position (illustrated in FIG. 8) and allows lever arm 130 to rotate between an upstream position (illustrated in FIG. 9) and a downstream position (illustrated in FIG. 1).

Bidirectional coupling 112 can include a clutch assembly that provides for actuation of rotatable shaft 110 as lever arm 130 rotates from an upstream position to a downstream position. The clutch assembly can allow free rotation of lever arm 130 about rotatable shaft 110 as lever arm 130 retracts from the downstream position to the upstream position. In this manner, the rotatable shaft 110 only rotates when lever arm 130 is forced from an upstream position to a downstream position by the body of water 10.

Lever arm 130 includes a first end 134 and a second end 132. Lever arm 130 is coupled to rotatable shaft 110 such that rotatable shaft 110 is located between first end 134 and second end 132. In an alternative arrangement (not illustrated), lever arm 130 could be coupled to rotatable shaft 110 at a location proximate second end 132 of lever arm 130. In this arrangement, the movement of lever arm 130 would be guided by a single guide member that provides for the lifting and lowering of lever arm 130 into body of water 10.

Referring to FIG. 2, flap member 136 is coupled to lever arm 130 at the first end 134 of lever arm 130. Flap member 136 preferably has a large surface area such that greater force is applied to flap member 136 by body of water 10. For instance, in a particular embodiment, flap member 136 can be a 4'×4' square. In another particular embodiment, flap member 136 can be a 10'×10' square. Those of ordinary skill in the art, using the disclosures provided herein, should understand that the present disclosure is not limited to any particular shape, size, or configuration of flap member 136 and that any suitable flap member 136 can be used without deviating from the scope of the present disclosure. In addition, flap member 136 can be disposed in body of water 10 at any angle relative to body of water 10.

A flotation device 135 can be coupled proximate first end 134 of lever arm 130 to assist in maintaining stability of lever arm 130 as body of water engages flap member 136. Lever arm 130 can further include a counterweight 138 located proximate the second end 132 of lever arm 130. Counterweight 138 can be used to assist in the pivoting of lever arm 130 between a first vertical position (illustrated in FIG. 2) where the flap member 136 is located in body of water 10 and a second vertical position (illustrated in FIG. 8) where the flap member 136 is located above body of water 10. The exact weight, location, and configuration of counterweight 138 will vary depending on design circumstances particular to each installation.

Apparatus 100 further includes a first guide member 140 and a second guide member 150. As will be discussed in more detail below, first guide member 140 and second guide member 150 are used to guide movement of lever arm 130 as lever arm 130 is pushed by the body of water 10 and retracted by tensioning member 160. First guide member 140 is positioned between rotatable shaft 110 and the first end 134 of lever arm 130. Second guide member 150 is positioned between rotatable shaft 110 and second end 132 of lever arm 130.

A front view of an exemplary first guide member 140 is illustrated in FIG. 7. As illustrated, first guide member includes a generally linear shape with an upward extending protrusion 142 located at one end of first guide member 140. As will be discussed in more detail below, upward extending protrusion 142 assists in guiding the lever arm 130 from the first vertical position to the second vertical position such that flap member 136 is lifted out of the body of water 10.

A front view of an exemplary second guide member 150 is illustrated in FIG. 4. The second guide member 150 of FIG. 4 includes a generally annular track that restricts movement of lever arm 130 in both a vertical and horizontal direction. The second guide member 150 is not limited to the shape and configuration illustrated in FIG. 4. For instance, the upper and lower edges of the second guide member 150 may not be perfectly level and/or parallel. Similarly, the left and right edges of the second guide member may not be perfectly level and/or parallel. The annular track can be adjustable to suit the particular needs of a given installation. For instance, in a particular embodiment, all four sides of the annular track can be length adjustable independent of the other sides using, for instance, a screw mechanism like a turnbuckle.

In an alternative arrangement (not illustrated), the second guide member 150 can include a track similar to first guide arrangement 140 illustrated in FIG. 7. In this alternative embodiment, second guide member 140 only partially limits movement of lever arm 130 in a vertical direction and does not limit movement of lever arm 130 in a horizontal direction.

Referring back to FIG. 2, tensioning member 160 is used to retract lever arm 130 from a downstream position to an upstream position. One end of tensioning member 160 is coupled to lever arm 130 at a location proximate first end 134 of lever arm 130. An opposing end of tensioning member 160 is coupled to a support structure 162 located upstream from lever arm on bank 20 adjacent body of water 10. Alternatively, support structure 162 could be located in the body of water 10. Tensioning member 160 applies a force on lever arm 130 generally biasing lever arm towards the upstream position. The force of the body of water 10 engaging flap member 136 is sufficient to overcome the bias supplied by the tensioning member 160, allowing the body of water 10 to rotate lever arm 130 from the upstream position to the downstream position.

With reference to FIGS. 3-10, a complete cycle for generating electrical energy from a body of water using apparatus 100 will be discussed in detail. FIG. 3 illustrates a perspective view of apparatus 100 before apparatus 100 begins its power stroke. As illustrated, tensioning member 160 has retracted lever arm 130 to an upstream position. Lever arm 130 is located in a first vertical position such that flap member 136 is located in the body of water. As illustrated in FIG. 4, the second end 132 of lever arm 130 is located in the top left-hand corner of second guide member 150 such that the second end 132 of lever arm 130 is 180° out of phase with the first end 134 of lever arm 130. The second end 132 of lever arm 130 will remain 180° out of phase with the first end 134 of lever arm 130 throughout operation of apparatus 100.

FIG. 5 illustrates a perspective view of apparatus 100 during a power stroke. As illustrated, the body of water 10 has engaged flap member 136 forcing lever arm 130 to rotate from an upstream position to a downstream position. The rotation of lever arm from the upstream position to the downstream position actuates rotatable shaft 110 and generates electrical energy in a power generation device. As shown in FIG. 6, the rotation of lever arm 130 from an upstream position to a downstream position causes second end 134 of lever arm 130 to move from the top left-hand corner of second guide member 150 to the top right hand corner of second guide member 150.

FIG. 7 illustrates how first guide member 140 facilitates pivoting of lever arm 130 from a first vertical position where the flap member 136 is located in the body of water 10 to a second vertical position (illustrated in FIG. 8) where the flap member 136 is located above the body of water 10. As illustrated, the momentum of the lever arm 130 generated as the body of water 10 pushes lever aim 130 from an upstream position to the downstream position causes the lever arm 130 to engage the upward extending protrusion 142 of first guide member at sufficient speed to lift the lever arm 130 from the first vertical position to the second vertical position. Counterweight 138 assists in lifting the first end 134 of lever arm 130 to the second vertical position by weighing down the second end 132 of lever arm 130.

FIG. 8 illustrates the lever arm 130 located in the second vertical position. As shown, flap member 136 is located above body of water 10 such that the body of water 10 no longer applies any force to flap member 136. Tensioning member 160 now has the capability to retract lever arm 130 from the downstream position to an upstream position as illustrated in FIG. 9.

Before beginning another power stroke, the flap member 136 of lever arm 130 must be lowered back into body of water 10. Second aim guide 150 assists in lowering flap member 136 back into body of water 10. As shown in FIG. 10, the second end 132 of lever arm 130 will move from the bottom-right hand corner to the bottom-left hand corner of second aim guide 150 as the tensioning member 160 retracts lever arm 130 from downstream position to an upstream position. The bottom-left hand corner of second arm guide 150 has an upward extending sloped portion 152. As the lever arm 130 travels along upward extending slope portion 152 of second arm guide 150, the second end 132 of lever arm 130 lifts upward causing the first end 134 of lever arm 130 and flap member 136 to be lowered into the body of water as illustrated in FIGS. 2 and 3. The apparatus 100 is now ready to begin another power stroke for generation of electrical energy. The process then repeats itself, providing for a continuous cycle for generation of electrical energy.

The apparatus and method according to embodiments of the present disclosure can be constructed and performed using simple technology. In particular, the present subject matter can be implemented using simple mechanical devices, such as levers, pulleys, bidirectional couplings, flotation devices, and guide members that require little maintenance. Power generation devices such as permanent magnet alternators or generators are become more prevalently used throughout the world so that unit costs are low and maintenance of the power generation devices are unnecessary. The units can simply be replaced with spares kept on site. The cost effectiveness and adaptability to low-head, low-flow environments enhances the ability of the present technology to provide an alternative source of power in remote areas of the world.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An apparatus for rotating a shaft couplable to a power generation device with a body of water flowing in a downstream direction, comprising:

a rotatable shaft, said rotatable shaft couplable to a power generation device configured to generate electrical energy from motion of said rotatable shaft;

a base supporting said rotatable shaft;

a lever arm coupled to said rotatable shaft with a bidirectional coupling, said lever arm having a first end and a second end, said lever arm comprising a flap member coupled to the first end of said lever arm, said lever arm movable between a first vertical position wherein said flap member is located in said body of water and a second vertical position wherein said flap member is located above said body of water; said lever arm is movable from an upstream position to a downstream position upon the body of water engaging said flap member when said lever arm is in the first vertical position; and a tensioning member coupled to said lever arm, said tensioning member configured to retract said lever arm from the downstream position to the upstream position when said lever arm is in the second vertical position;

wherein said apparatus further comprises a first guide member located between said rotatable shaft and the first end of said lever arm, said first guide member comprising an upward extending protrusion configured to guide said lever arm from the first vertical position to the second vertical position.

2. The apparatus of claim 1, wherein said lever arm is configured to actuate said rotatable shaft when said lever arm moves from the upstream position to the downstream position.

3. The apparatus of claim 1, wherein said rotatable shaft is locatable on a bank adjacent said body of water.

4. The apparatus of claim 1, wherein said rotatable shaft is coupled to said lever arm between the first end and the second end of said lever arm.

5. The apparatus of claim 4, wherein said lever arm comprises a counterweight located proximate the second end of said lever arm.

6. The apparatus of claim 4, wherein said apparatus further comprises a second arm guide located between said rotatable shaft and the second end of said lever arm, said second arm guide comprising an annular track configured to limit horizontal and vertical movement of said lever arm.

7. The apparatus of claim 6, wherein said annular track comprises an upward sloped portion configured to guide said lever arm from the second vertical position to the first vertical position.

8. The apparatus of claim 1, wherein said lever arm further comprises a flotation device located proximate said flap member.

9. The apparatus of claim 1, wherein the apparatus further comprises:
    a power generation device; and
    means for coupling the rotatable shaft to the power generation device.

10. A method of rotating a rotatable shaft couplable to a power generation device with a body of water flowing in a downstream direction using a lever arm having a first end and a second end, the lever arm supported by a base, the lever arm coupled to the rotatable shaft with a bidirectional coupling, the lever arm comprising a flap member coupled to the first end of the lever arm, the method comprising:
    pivoting the lever arm from a second vertical position wherein the flap member is located above the body of water to a first vertical position wherein the flap member is located in the body water;
    rotating the lever arm from an upstream position to a downstream position upon the body of water engaging the flap member when the flap member is located in the first vertical position;
    actuating a rotatable shaft with the lever arm when said lever arm rotates from the upstream position to the downstream position;
    pivoting the lever arm from the first vertical position to the second vertical position using a first guide member having an upward extending protrusion; and
    retracting the lever arm from the downstream position to the upstream position with a tensioning member when the lever arm is in the second vertical position.

11. The method of claim 10, wherein the method further comprises pivoting the lever arm from the second vertical position to the first vertical position by guiding the lever arm with a second guide member comprising an annular track having a sloped portion configured to guide the lever arm from the second vertical position to the first vertical position.

12. The method of claim 10, wherein the method comprises locating the rotatable shaft on a bank adjacent the body of water.

13. The method of claim 10, wherein the rotatable shaft is coupled to a power generation device with a means for coupling the rotatable shaft to the power generation device.

14. An apparatus for rotating a shaft couplable to a power generation device with a body of water flowing in a downstream direction, comprising:
    a rotatable shaft, said rotatable shaft couplable to a power generation device configured to generate electrical energy from motion of said rotatable shaft;
    a base supporting said rotatable shaft;
    a lever arm having a first end and a second end, said lever arm coupled to said rotatable shaft with a bidirectional coupling such that said rotatable shaft is located between the first end and the second end of said lever arm, said lever arm comprising a flap member coupled to the first end of said lever arm and a counterweight located proximate the second end of said lever arm, said lever arm movable between a first vertical position wherein said flap member is located in said body of water and a second vertical position wherein said flap member is located above said body of water, said lever arm further movable from an upstream position to a downstream position upon the body of water engaging said flap member when said lever arm is in the first vertical position;
    a tensioning member configured to retract said lever arm from the downstream position to the upstream position when said lever arm is in the second vertical position;
    a first guide member located between said rotatable shaft and the first end of said lever arm, said first guide member comprising an upward extending protrusion configured to guide said lever arm from the first vertical position to the second vertical position;
    a second guide member located between said rotatable shaft and the second end of said lever arm, said second guide member comprising an annular track configured to limit horizontal and vertical movement of said lever arm, said annular track comprising an upward sloped portion configured to guide said lever arm from the second vertical position to the first vertical position;
    wherein said lever arm actuates said rotatable shaft when said lever arm moves from the upstream to the downstream position.

15. The apparatus of claim 14, wherein said first guide member, rotatable shaft, and second guide member are locatable on a bank adjacent the body of water.

16. The apparatus of claim 14, wherein said first guide member, rotatable shaft, and second guide member are located on a mobile device.

17. The apparatus of claim 14, wherein the apparatus further comprises:
    a power generation device; and
    means for coupling the rotatable shaft to the power generation device.

* * * * *

UNITED STATES PATENT AND TRADEMARK OFFICE
CERTIFICATE OF CORRECTION

| | |
|---|---|
| PATENT NO. | : 8,049,357 B2 |
| APPLICATION NO. | : 13/034132 |
| DATED | : November 1, 2011 |
| INVENTOR(S) | : John A. Saavedra |

Page 1 of 1

It is certified that error appears in the above-identified patent and that said Letters Patent is hereby corrected as shown below:

In the Claims:

Claim 1, Column 8, line 41 after the word "arm", please delete "is"

Signed and Sealed this
Fourteenth Day of May, 2013

Teresa Stanek Rea
*Acting Director of the United States Patent and Trademark Office*